United States Patent
Viaud

(10) Patent No.: US 8,517,158 B2
(45) Date of Patent: Aug. 27, 2013

(54) AGRICULTURAL IMPLEMENT AND A VEHICLE COMBINATION HAVING A SENSOR TO DETECT THE OPEN CONDITION OF A COVER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 788 days.

(21) Appl. No.: 12/420,262

(22) Filed: Apr. 8, 2009

(65) Prior Publication Data

US 2009/0255775 A1    Oct. 15, 2009

(30) Foreign Application Priority Data

Apr. 12, 2008   (DE) .......................... 10 2008 018 541

(51) Int. Cl.
 *F16D 9/00* (2006.01)
(52) U.S. Cl.
 USPC .......................................................... 192/135
(58) Field of Classification Search
 USPC ................................................. 192/135, 133
 See application file for complete search history.

(56) References Cited

U.S. PATENT DOCUMENTS 6,092,013 A   7/2000   Stelzle et al.

FOREIGN PATENT DOCUMENTS

| DE | 43 09 668 | 9/1994 |
| EP | 1 293 117 | 3/2003 |
| EP | 1 593 299 | 11/2005 |
| EP | 1 813 146 | 8/2007 |

OTHER PUBLICATIONS

European Search Report, 6 Pages, Aug. 5, 2009.

*Primary Examiner* — David D Le
*Assistant Examiner* — Ryan Dodd

(57) ABSTRACT

A combination is provided of an agricultural implement and vehicle. The implement includes components that can be driven that are connected to a power take-off shaft of the vehicle, the components being covered by at least one manually opened cover. A sensor is also provided to detect the open status of the cover, that is coupled to an electronic control unit of the implement. The electronic control unit, is connected with an electronic control unit of the vehicle. The electronic control unit of the implement instructs the electronic control unit of the vehicle in case of an opening of the cover detected by the sensor and advises an actuator to disengage a clutch of the power take-off shaft and/or to prevent the actuator from engaging the clutch.

3 Claims, 1 Drawing Sheet

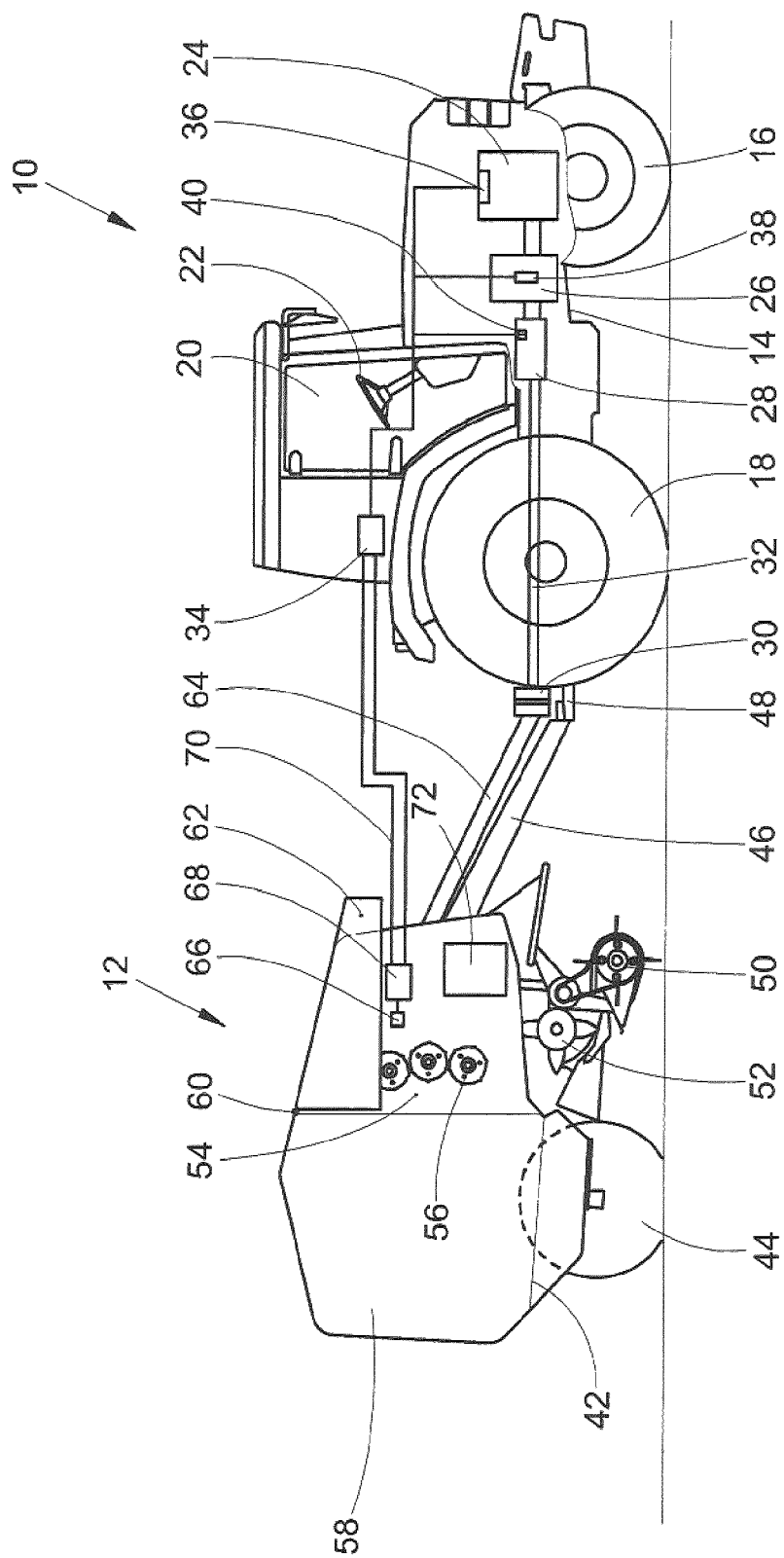

AGRICULTURAL IMPLEMENT AND A VEHICLE COMBINATION HAVING A SENSOR TO DETECT THE OPEN CONDITION OF A COVER

FIELD OF THE INVENTION

The invention concerns a combination of an agricultural implement and a carrier vehicle or towing vehicle where the carrier vehicle or towing vehicle is provided with a power take-off shaft that can be turned on and off selectively by means of a clutch. The implement includes elements that can be driven and are connected to the power take-off shaft and are covered by at least one cover that can be opened. The implement is provided with a sensor to detect the open status of the cover. The sensor is coupled with the electronic control arrangement of the implement and is operable to bring about an interruption of the drive of the elements of the implement in case an opening of the cover is detected by the sensor.

BACKGROUND OF THE INVENTION

In agricultural implements, moveable elements are typically covered for safety reasons in order to protect the operator and other persons. However, since the interior of the implements must be accessible for reasons of control and maintenance, the covers are frequently attached to the implement so that they can be removed or pivoted out of the way. In order to prevent accidents, the covers, as a rule, can be opened only by using appropriate tools, with the disadvantage that they cannot be opened without the appropriate tools. If these tools are not available when needed, work on the implement is not possible.

Moreover, it has been proposed that the internal combustion engine of a self propelled agricultural operating machine be stopped automatically when a sensor detects that a cover of the operating machine had been opened (DE 43 09 668 A). Since the cover as well as the internal combustion engine are located on board the self propelled operating machine, the attainment of control is not a problem. Monitoring of the cover is more difficult in the case of implements that are carried or towed by a vehicle, or connected with it by other means and are driven by a power take-off shaft of the vehicle, since the implement would have to be integrated into the control of the vehicle in order to turn off its drive. It has been proposed, for example, to arrange a separate clutch in the drive line of a baler downstream of the power take-off shaft of a tractor, that can be controlled automatically when the covers are in an open condition, as detected by the sensors, so that the driven components of the baler are forcibly retained (DE 101 45 407 A). Here the cost of the additional clutch is seen as a disadvantage.

EP 1 813 146 A describes a combination of a tractor and a baler, each of which is equipped with an electronic control unit. The control units communicate with each other over a bus, so that the control arrangement of the baler can instruct the control arrangement of the tractor to stop in order to wrap and eject the bale. Before the initiation of a baling process the control of the baler brings about the rotation of the power take-off shaft of the tractor.

SUMMARY OF THE INVENTION

The problem underlying the invention is seen in the need to define a combination of an agricultural implement and a vehicle in which accidents are prevented that could occur if covers are opened during operation of the implement without great cost.

A combination is composed of an agricultural implement and a vehicle by means of which the implement can be carried, towed or otherwise moved across a field. The vehicle includes an electronic control unit that is connected with an actuator with which a clutch for a power take-off shaft can be engaged or disengaged. The implement, in turn, is provided with elements that can be driven by the power take-off shaft. Furthermore, the implement includes a control unit associated with it, that is connected with a sensor, that detects the opened condition of a manually operated cover of the implement and that is used as a cover of the driven elements. The two control units communicate with each other across a bus connection that may be connected by wire, by light wave sensors or wirelessly, for example by radio or light waves. The bus connection may in particular be configured according to ISO 11783. In case the sensor of the electronic control unit reports that the cover has been opened or will be opened, the electronic control unit of the implement transmits to the electronic control unit of the vehicle a warning to bring about the disengagement of the clutch, to prevent danger to the operator or other persons in the vicinity resulting from the open cover. If the clutch of the power take-off shaft has not yet been disengaged at the time of the opening, the electronic control unit of the carrier vehicle or the towing vehicle prevents the actuator from engaging the clutch, even though an operator turns on the power take-off control. In both cases warnings are preferably transmitted to the operator.

Since the stoppage or prevention of the operation of the power take-off relies, as a rule, on already existing components, the result, is an automatic stoppage of the moveable elements of the implement, in order to avoid the danger of accidents due to the open cover. The safety concerns can now be met even with covers that can be removed without tools.

The invention can be applied to any agricultural implement that is provided with elements driven by power take-off shafts and protected by covers. Examples of the above are balers for round or rectangular bales, self loading forage boxes, ground breaking implements, mower heads and attached or towed forage harvesters.

BRIEF DESCRIPTION OF THE DRAWINGS

The embodiments of the invention will now be described with reference to the accompanying drawing wherein:

the single drawing FIGURE is a schematic side view of a combination of a towing vehicle in the form of a tractor and an implement in the form of a round baler.

DESCRIPTION OF THE PREFERRED EMBODIMENT

The combination shown is composed of a towing vehicle 10 in the form of a tractor and an implement 12 in the form of an agricultural round baler. The towing vehicle 10 includes a chassis 14 equipped with a frame that is supported on the ground by front, steerable wheels 16 and rear, driven wheels 18. A cab 20 is fastened to the chassis 14 with an operator's workstation, at which a seat (not shown) and a steering wheel 22 are arranged. An internal combustion engine 24 is also mounted to the chassis 14. The crankshaft of the internal combustion engine 24 is connected with a power take-off shaft gearbox 28 over a clutch 26. The gearbox 28 in turn drives a power take-off shaft outlet 30 over a power take-off shaft 32. An electronic control unit 34 is connected with an engine control unit 36, that controls the operating parameters of the internal combustion engine 24, and is connected with an actuator 38 controlled by external forces, that can engage and disengage the clutch 26 and, may be actuated electrically or hydraulically. The electronic control unit 34 is also connected with an actuator 40 with which the transmission ratio and the output rotational speed of the power take-off shaft gearbox 28 can be selected. The internal combustion engine 24 also drives the wheels 18 and if necessary 16 over another gearbox, not shown.

The implement 12 includes a chassis 42, supported on the ground by wheels 44 and is connected over a towbar 46 to an attachment coupling 48 of the towing vehicle 10. The implement 12 includes a crop take up arrangement 50, that conveys in an overshot manner harvested crop lying on the field and conducts it to a rotor 52 that conveys it to a baling chamber 54. The baling chamber 54 is enclosed by rolls 56. In the rear region of the implement 12 a back door 58 is provided that can be opened upward and to the rear, it is connected in joints on the upper side of the chassis 42 for the ejection of a completed bale about a horizontal axis 60 extending transverse to the forward operating direction. The rolls 56, the rotor 52 and the crop take up arrangement 50 are connected with the power take-off shaft outlet 30 of the towing vehicle 10 via the drive shaft 64. The forward upper region of the implement 12 is covered to the outside by a cover arrangement 62 that can be opened and closed, (shown in the FIGURE in the open position) and is connected in joints at its upper edge to a horizontal axis extending in the forward operating direction fastened to the chassis 42 of the implement 12 and can be moved by a hydraulic cylinder (not shown). The cover 62, in its closed position, covers the rolls 56 arranged ahead of the back door 58 to the outside and prevents an operator of the implement or another person from reaching into the interior of the implement 12 and being injured by moving elements, in this case, by the rolls 56. In its open position the cover 62 permits a control and maintenance of the rolls 56 and access to consumable material, such as wrapping material or twine, that are stored in a storage area 72 provided ahead of the roll 56. The implement may be configured as a round baler with a fixed chamber size, as shown, or as a round baler with variable chamber size.

A sensor 66 is associated with the cover 62, and responds upon opening of the cover 62. The sensor 66 may be configured for example as a mechanical switch actuated by the cover. Similarly magnetic sensors could also be used (for example, reed relays, hall sensors, or induction sensors) that interact with the cover or ferro-magnetic or permanent magnetic materials. The sensor 66 is connected with an electronic control unit 68 that is in turn connected over a bus 70 with the electronic control unit 34 of the towing vehicle 10. The bus 70 can operate according to the standard ISO 11783. The engine control 36 and the actuators 38 and 40 may be connected by associated lines, as shown in the FIGURE, or by the bus 70 with the control unit 34. Analogously the sensor 66 may be connected with the control arrangement 68 by an associated line, as shown in the FIGURE, or by the bus 70.

Preferably the electronic control units 34, 68 are used for the automatic control of the combination of towing vehicle 10 and implement 12, for example, for automatic control of the speed of the towing vehicle 10 as a function of the rate at which the harvested crop is taken up and the actual size of the bale, and for the automatic stopping and restarting of the combination after completion and ejection of a bale. For this purpose, reference is made to the disclosure of EP 1 813 146 A that is hereby incorporated into the present document by reference.

In order to prevent the operator from opening the cover 62 while the drive shaft 64 is rotating and injuring himself on the rotating rolls 56, the control units 34, 68 are programmed in such a way that the control arrangement 68 of the implement 12 transmits a warning to the control unit 34 of the towing vehicle 10, to bring the actuator 38 into a position disengaging the clutch 26 when the sensor 66 of the control unit 34 of the implement 12 transmits a warning that the cover 62 is in the open position. Therefore the power take-off shaft 32 is stopped immediately which leads also to an immediate stop of the driven elements 56. In this case It would also be conceivable to activate a power take-off shaft brake (not shown) of the towing vehicle 10. If the power take-off shaft 32 was not yet in operation at the time of the opening of the cover 62, the electronic control unit 34 of the towing vehicle 10 prevents the actuator 38 from engaging the clutch 26. Moreover, a warning is issued to the operator that may be visual via a display arrangement or an audible message. The control unit 68 informs the control unit 34 that the safety requirements have been re-established when the sensor 66 informs the control unit 68 that the cover 62 had been closed. The control unit 34 thereupon advises the actuator 38 to engage the clutch 26, but preferably only after the operator has actuated a confirming key or has turned on a power take-off shaft switch. Moreover, the back door 58 may also be equipped with a sensor 66 that brings about, by means of the control units 68,34, a stoppage of the power take-off shaft 32 that is turned off automatically or remains turned off when the back door 58 is open.

Having described the preferred embodiment, it will become apparent that various modifications can be made without departing from the scope of the invention as defined in the accompanying claims.

The invention claimed is:

1. A combination of an agricultural implement and vehicle for towing or carrying the implement, the vehicle being provided with a power take-off shaft that is selectively engaged and disengaged by way of a clutch, the implement having elements that are driven by the power take-off shaft and that are covered by at least one manually operated cover, and the implement further having a sensor to detect an open condition of the cover the sensor being coupled to an electronic control unit of the implement that brings about an interruption of the drive of the elements of the implement in the case of an opening of the cover detected by the sensor, wherein the electronic control unit of the implement is connected with an electronic control unit of the vehicle, the electronic control unit of the vehicle being connected to an actuator actuated by external forces for the engagement and disengagement of the clutch of the power take-off shaft, and the electronic control unit of the implement affecting the electronic control unit of the vehicle in the case of an opening of the cover detected by the sensor and instructing the actuator to disengage the clutch of the power take-off shaft and/or to prevent the actuator from engaging the clutch.

2. The combination according to claim 1, wherein the implement is a round baler and the cover is one of: a back door of the round baler; or, a cover separate from the back door.

3. The combination according to claim 1, wherein the electronic control unit of vehicle is operated in such a way as to advise the actuator after a confirmed opening of the cover to engage the clutch when the electronic control unit of the implement has informed the electronic control unit of vehicle, that the sensor indicates that the cover has again been closed and an operator has one of: depressed a confirming key; or, turned on a power take-off shaft switch.

* * * * *